Oct. 2, 1928.
S. H. NORTON
1,686,496
CHAIN HOIST
Filed Aug. 13, 1925
2 Sheets-Sheet 1
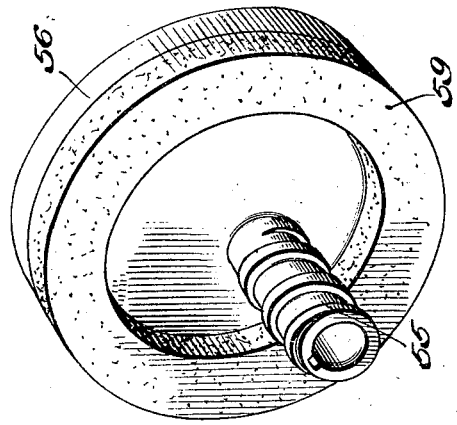
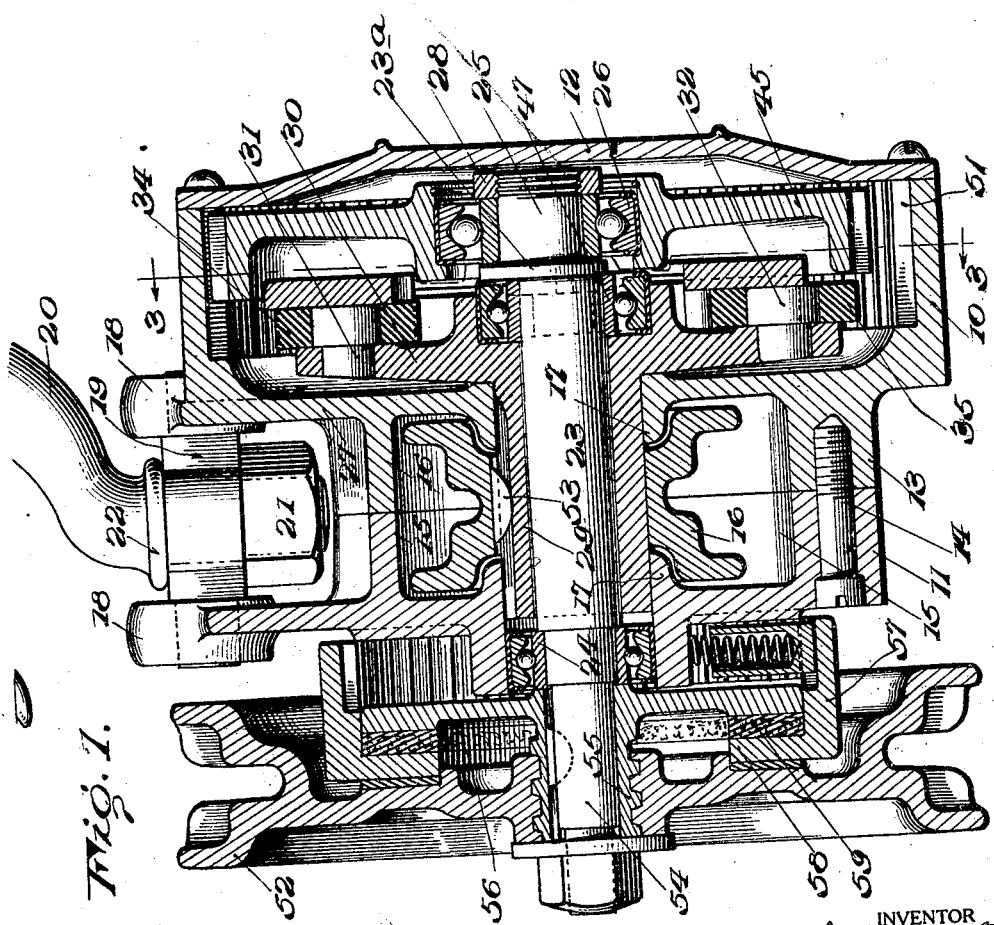
WITNESSES
W. A. Williams
INVENTOR
S. H. Norton
BY
Quesada
ATTORNEY Oct. 2, 1928.

S. H. NORTON 1,686,496

CHAIN HOIST

Filed Aug. 13, 1925

WITNESSES

INVENTOR
S. H. Norton
BY
ATTORNEY

Patented Oct. 2, 1928.

1,686,496

UNITED STATES PATENT OFFICE.

SAMUEL H. NORTON, OF MEADVILLE, PENNSYLVANIA.

CHAIN HOIST.

Application filed August 13, 1925. Serial No. 50,074.

This invention relates to that type of speed reducing gearing known as eccentric differential reduction gearing for particular use in chain hoist drives.

An object of the invention is the provision of a device in which the power is transmitted to a sheave from a driving shaft through a flanged sleeve, an eccentric differential reduction gearing and a disc intermediately disposed between the sleeve and said gearing, the sleeve being mounted for rotation in a casing forming a housing for the gearing.

Another object of the invention is the provision of a chain hoist in which a floating member forms the intermediary for the transmission of power between a system of reduction gearing and a power chain wheel so that shocks to the gearing during stopping and reversing is obviated.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a vertical longitudinal section of a chain hoist constructed according to the principles of my invention.

Figure 2 is a view in perspective of the locking and releasing means for the hand wheel.

Figures 3, 4:
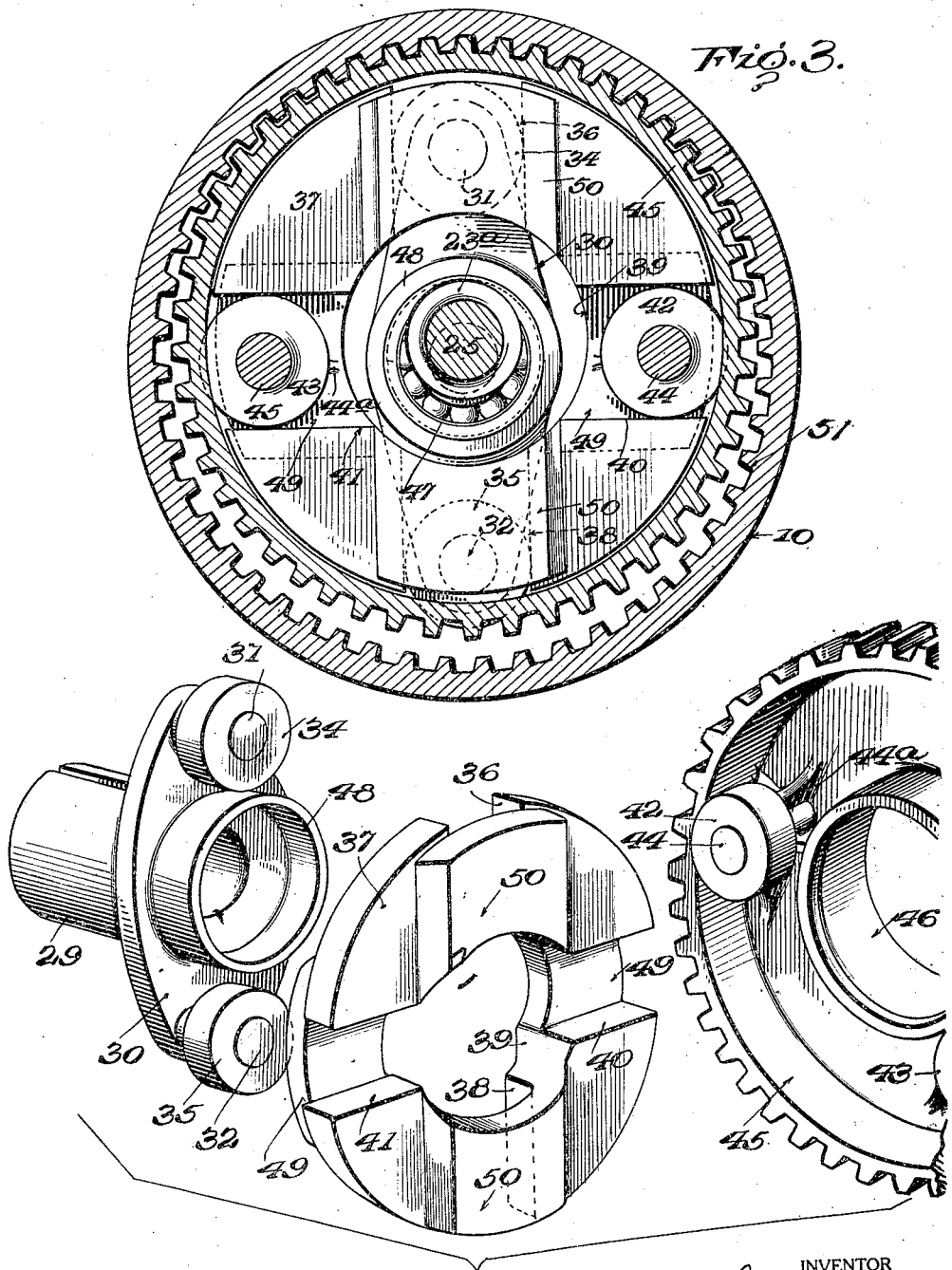
Figure 3 is a vertical section taken along the line 3—3 of Figure 1.
Figure 4 is a perspective view of the differential mechanism for controlling the speed of the hoist.

Referring more particularly to the drawings, it will be seen that the housing is composed of two sections 10, 11 and a closure 12 bolted to section 10. Section 10 is cup-shaped and forms a housing for the reduction gearing of the hoist. A rearwardly projecting flange 13 on housing 10 contacts with section 11, and the flange 13 and section 11 are secured together by bolts 14. Sections 10 and 11 as bolted together not only form a partial housing 15 for a load chain wheel 16 but annular flanges 17 provide abutments or lateral bearings for centering said wheel in the partial housing.

The upper ends of the sections or plates 10 and 11 have bearings 18 to receive the ends of a pintle 19. The pintle is provided with a perforated boss through which is inserted the threaded end of a supporting hook 20. A nut 21 and a shoulder 22 cooperate to lock the hook in rigid relation with the pintle so that the combined housings are swingably carried by said hook.

A shaft 23 has a reduced portion mounted in a ball bearing 24 at one end of the annular flange 17 of the section 11. The opposite end 25 of the shaft is seated in a ball bearing 26, this end of the shaft being eccentrically formed relative to the shaft proper. A nut 28 screwed to the end of the shaft insures the position of the bearing 26.

A hollow sleeve 29 embracing the shaft 23 for a portion of its length terminates adjacent the bearing 24 and is mounted for rotation in the cooperating flanges 17 of the sections 10 and 11 of the housing. A flange 30 formed integrally with the sleeve and disposed adjacent the inner face 27 of section 10 and within said section 10 of the housing, is provided with diametrically arranged axles 31 and 32 carrying rollers 34 and 35 respectively. Roller 34 is located in a slot 36 of a floating disc 37 while roller 35 is received by a slot 38. These slots terminate at their inner ends adjacent a central opening 39 in the disc but which is eccentric relative to the shaft 23 passing through said opening. The inner face of the floating disc 37 is provided with integrally formed plates 49 spanning the slots 40 and 41, thereby providing housings for the rollers 42 and 43. The outer face of said disc also has diametrically disposed and integrally formed plates 50 spanning slots 36 and 38 to provide housings for the rollers 34 and 35. The disc 37 is provided with diametrically opposed slots 40 and 41 which receive respectively rollers 42 and 43 mounted on pins 44. The pins project laterally from an inner face of an eccentric gear 45 having shoulders 44$^a$ which space the rollers from said gear.

The gear has a hub section 46 in which is mounted the ball bearing 26. A ball bearing 47 is mounted in a hub section 48 on the flange 30. The inner end of the ball bearing 26 is spaced from the ball bearing 47 by a collar 23ª formed integrally with the shaft 23.

The inner peripheral face of the housing 10 is provided with a ring gear 51 in mesh with the eccentric gear 45 and has approximately four more teeth than the eccentric gear.

Rotary motion is transmitted from a hand chain wheel 52 to shaft 23. The revolving eccentric 48 causes the gear 45 to rotate but because said gear is in mesh with the stationary ring gear 51 and has less teeth than the ring gear, gear 45 will travel around gear 51 but in the opposite direction. Since gear 45 is connected to flange 30 by means of the oppositely projecting pairs of rollers 34, 35 and 42, 43 and the floating disc 37, the sleeve 29 will be revolved, thereby rotating the load chain wheel 16. Sleeve 29 is connected to wheel 16 by a Woodruff key 53.

The eccentric passage 39 in the disc 37 and the elongated slots 36, 38, 40 and 41 permits the floating disc to automatically readjust its position during rotation towards or away from the axis of the shaft and in cooperation with the rollers mounted in the slots provides for the elimination of strains in the driving mechanism just described, in order to prevent stripping the gears during a sudden reaction in the disposition of the load.

The operation of my device is as follows:

When the hand chain wheel 52 is revolved in the usual manner, shaft 23 is revolved causing an eccentric rotation of the gear 45 which, being in mesh with the gear 51, is caused to be rotated in a reverse direction to the rotation of shaft 23. The rollers 42 and 43 engaging the slots 40 and 41, respectively of the floating disc 37, causes said disc to be revolved. This disc in turn imparts rotary motion to the flange 30 by means of the rollers 34 and 35 respectively operating in the slots 36 and 38 of the floating disc 37. By reason of the eccentric disposition of the floating disc 37 with respect to the shaft 23, said disc is adapted to oscillate while being rotated and since the flange 30 is connected with the sleeve 29 and the wheel 16 is connected to said sleeve the hand wheel is likewise rotated.

In view of the fact that the gear 45 has approximately four teeth less than the gear 51, gear 45 will have a less speed of rotation than shaft 23 so that the wheel 16 is likewise rotated at a less speed than shaft 23 and hand wheel 52. The purpose of the floating disc 37 is to provide a means for transmitting the orbital motion of gear 45 to sleeve 29 through the flange 30.

In order to retain the load at any predetermined height or to release and raise or lower the load I have provided a well known form of mechanism for connecting the hand chain wheel 52 to the shaft 23 at the reduced end 54 of said shaft.

The hand wheel is internally threaded to engage the threaded sleeve 55 on the friction disc 56. The friction disc is received within a cup shaped member 57 having a flange 58 engaged between the hand wheel and a packing 59.

The particular locking mechanism shown in Figure 1 and connected with the hand wheel 52 is a well known form of locking mechanism used in chain pulleys and need not be described but in a general manner. The rotation of the hand wheel drives the shaft 23 and upon release of the load the hand wheel will be forced into clamping engagement with the disc 56, and the ring 59. The hand wheel and likewise the shaft 23 are prevented from reverse rotation and thus the load will be held against release.

What I claim is:

1. A hoist comprising a housing having a fixed internal ring gear, a shaft mounted axially of the housing and provided with an eccentric gear in mesh with the ring gear and rotatable on the eccentric of the shaft, a sleeve on the shaft and provided with a diametrically disposed flange, a roller projecting laterally from each end of the flange, a floating disc provided with slots, a pair of the slots receiving the rollers, said disk being mounted eccentrically of the shaft, the rotatable gear having diametrically disposed rollers received by the remaining slots in the disk.

2. A hoist comprising a housing having a fixed internal ring gear, a shaft mounted axially of the housing and provided with an eccentric gear in mesh with the ring gear and rotatable on the eccentric of the shaft, a sleeve on the shaft and provided with a diametrically disposed flange, a roller projecting laterally from each end of the flange, a floating disk provided with slots, a pair of the slots receiving the rollers, said disk being mounted eccentrically of the shaft, the rotatable gear having diametrically disposed rollers received by the remaining slots in the disk, a plate spanning each slot and connected at the ends thereof to the disk and forming pockets for housing the rollers, a pair each of the plates being located on an opposite face of the disk.

In testimony whereof I affix my signature.

SAMUEL H. NORTON.